United States Patent [19]

Une et al.

[11] Patent Number: 4,829,320

[45] Date of Patent: May 9, 1989

[54] BELT DRIVE FOR THERMAL PRINTER

[75] Inventors: Ryuzo Une; Kenichi Naruki, both of Fukuyama, Japan

[73] Assignee: Mitsubishi Denki Kabushiki Kaisha, Tokyo, Japan

[21] Appl. No.: 198,013

[22] Filed: May 24, 1988

[30] Foreign Application Priority Data

Jun. 11, 1987 [JP] Japan ................................ 62-147241

[51] Int. Cl.$^4$ .......................... G01D 15/10; B41J 3/20; B65H 20/00

[52] U.S. Cl. ............................... 346/76 PH; 346/136; 226/170; 226/172; 226/174; 226/182; 271/34; 400/120; 400/635

[58] Field of Search .................. 400/120, 635; 271/34; 226/170, 172, 174, 186, 182; 346/76 PH, 136

[56] References Cited

U.S. PATENT DOCUMENTS 4,446,467 5/1984 Takiguchi et al. ............. 346/76 PH
4,712,114 12/1987 Kikuchi .......................... 346/76 PH

FOREIGN PATENT DOCUMENTS 6362756 3/1988 Japan .................................. 400/120

*Primary Examiner*—E. A. Goldberg
*Assistant Examiner*—Gerald E. Preston
*Attorney, Agent, or Firm*—Sughrue, Mion, Zinn, Macpeak and Seas

[57] ABSTRACT

A thermal transfer printer employs a relatively small diameter platen roller 20 flanked by a pair of sprockets 3c which support endless timing belts 2. A clamp 7' for gripping the leading edge of a sheet 6 to be printed is mounted laterally across and between the belts. The attendantly small radius of curvature of the roller at the printing station prevents any contact by components and structure mounted to the reciprocable printing head 1.

4 Claims, 1 Drawing Sheet

BELT DRIVE FOR THERMAL PRINTER

BACKGROUND OF THE INVENTION

This invention relates to a belt drive arrangement for advancing a sheet or web of material through the printing station in a thermal transfer printer.

FIG. 1 shows a schematic side view of a conventional thermal printer as disclosed in Japanese koho No. 83/142887, wherein a platen drum 30 covered with rubber or the like is provided with a transverse clamp 7 for engaging the leading edge of a sheet or web 6 of paper or other material to be printed upon, the length of such sheet being less than the outer circumference of the drum. Reference numeral 1 designates a thermal printing head reciprocable to and away from the platen drum by a drive mechanism, not shown, and 8 is an ink ribbon which, in the case of a color printer, would carry successive ink portions of yellow, magenta, cyan and possibly black as disclosed, for example, in U.S. Pat. No. 4,558,329.

In operation, referring to a color printer, the leading edge of the sheet 6 is firmly gripped by the clamp 7 and advanced by the rotation of the drum in the direction of arrow A to a point just past the printing station, whereafter the thermal head 1 is urged against the platen drum, the ribbon 8 is advanced, and the drum rotation is continued to implement the printing of a first color separation on the sheet 6 under the control of selective signals individually applied to the heating elements of the head from an external control source, not shown. Upon the completion of the first color separation printing the head 1 is displaced away from the drum, the ribbon 8 is advanced to present a new color portion at the printing station, the drum with the clamped sheet 6 wrapped therearound is rotated in a reverse direction to return the leading edge of the sheet to its initial or start position, and the previously described operation is repeated to successively print the different color separations on the sheet in registration with each other.

A conventional thermal printer of this type requires a platen drum diameter of at least 160 mm when Japanese Industrial Standard A3 size paper is used, which unduly increases the overall size of the entire device. Furthermore, the large drum diameter attendantly increases the radius of curvature of the drum at the printing station, whereupon some of the integrated circuit drivers and other electronic components mounted on a ceramic substrate of the thermal head are prone to contact the outer surface of the drum. This can be avoided by increasing the size of the ceramic substrate, but at the expense of increased cost for the thermal head assembly.

SUMMARY OF THE INVENTION

This invention effectively overcomes the drawbacks and disadvantages of the prior art as noted above by replacing the conventional large drum with a small diameter platen roller coaxially flanked by a pair of sprockets or pulleys which support a pair of endless timing belts of sufficient length to accommodate the largest size paper for which the printer is designed. The clamp for the leading edge of the paper sheet is mounted laterally across and between the belts, which are driven in the same direction to implement the printing of successive color separations rather than being reversed as in the prior art. The platen roller is of substantially the same diameter as the sprockets such that the peripheral speeds of the roller, the belts and the clamp are approximately the same.

DETAILED DESCRIPTION OF THE PREFERRED EMBODIMENT

Figure 1:
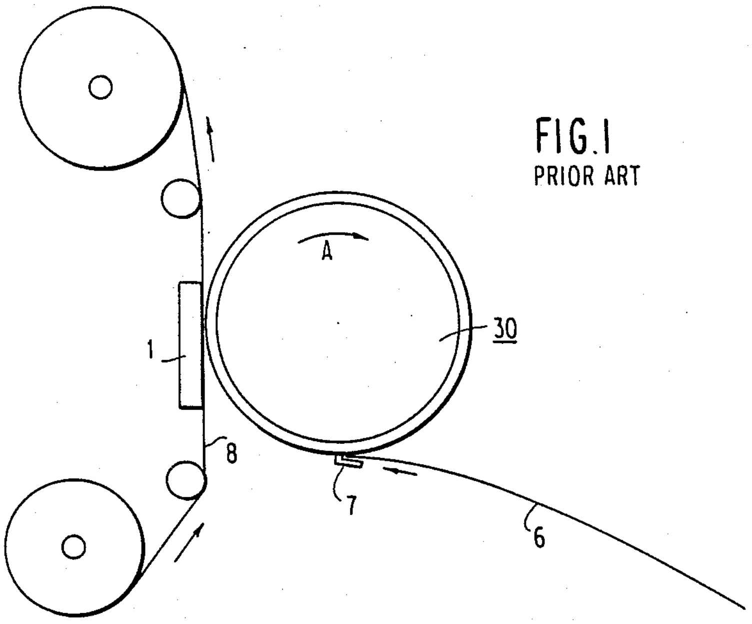
FIG. 1 PRIOR ART
FIG. 1 shows a schematic elevation of a conventional thermal transfer printer using a platen drum.
Figure 2:
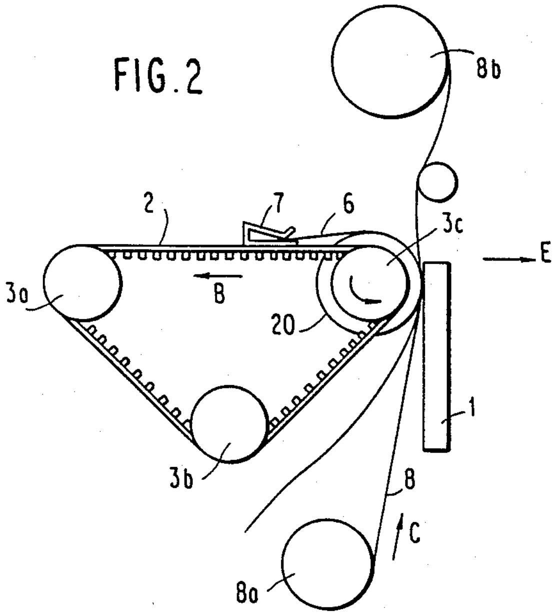
FIG. 2 is a simplified elevation of a thermal transfer printer in accordance with the invention.
Figure 3:
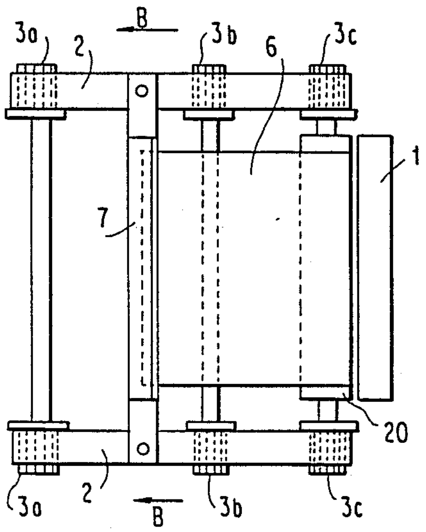
FIG. 3 is a plan view of the printer shown in FIG. 2.

Referring to FIGS. 2 and 3, a pair of endless timing belts 2 are disposed in parallel around three pairs of coaxial support and/or drive pulleys or sprockets **3*a*, 3*b*, 3*c* oriented in a triangular configuration. One of the sprocket pairs 3*a* or 3*b* is preferably biased outwardly by spring means or the like, not shown, to maintain the belts 2 under an appropriate level of tension. A clamp 7′ for firmly gripping the leading edge of the sheet 6 of print paper is mounted laterally across and between the timing belts as best shown in FIG. 3. A platen roller 20 covered with a layer of rubber or elastomer and having a diameter substantially less than that of the drum 30 shown in FIG. 1 is rigidly mounted on the same shaft as the sprockets 3*c* for rotation therewith. At least one of the sprocket pair shafts is rotatably driven by and under the control of drive means, not shown, to advance the timing belts in the direction of arrow B in FIG. 2** and to attendantly rotate all of the sprocket pairs in the direction shown by arrow D.

The operation of the printer is substantially the same in all major respects as that described above in connection with FIG. 1, with the leading edge of the sheet 6 to be printed extending around the platen roller 20 and being firmly engaged by the clamp 7′ mounted across the timing belts, and with the ribbon 8 being advanced in the direction of arrow C from its supply reel **8*a* to a takeup reel 8*b* to successively present different ink colors at the printing station in the case of color printing. Unlike the FIG. 1 printer, however, in accordance with the invention the timing belts and thus the clamp 7′ and engaged sheet 6 are always advanced in the same direction of arrow B rather than being periodically reversed to implement the printing of successive color separations. Thus, from an initial start position as approximately shown in FIGS. 2 and 3, the belts are advanced until the clamp 7′ arrives at a position between sprockets 3*b* and 3*c* to print a first color separation, at which time the thermal head 1 is tilted or moved away from the printing station as shown by arrow E and the rotation of the belts continues until the start position is again reached. At this point the belts are temporarily halted, the ribbon 8 is advanced to present a new color at the printing station, the thermal head is urged back against the sheet 6 and platen roller 20, and the timing belts 2** are again driven through another "cycle" to implement the printing of the second and successive color separations.

Upon the completion of the printing operation, whether involving a single cycle in the case of a unicolor print or a plurality of cycles for a color print, the sheet 6 is disengaged from the clamp 7′ and conveyed away from the platen roller by conventional means, not shown or forming a part of the invention.

While the respective diameters of the platen roller 20 and the sprockets **3*c*** must be substantially the same such that the peripheral speed of the platen roller is essentially equal to that of the timing belts and thus the clamp 7', it is preferable that the platen roller diameter be slightly greater than that of the sprockets 3c such that the peripheral speed of the roller is slightly faster than that of the belts and clamp. This is exaggeratedly shown in FIG. 2, and ensures that the sheet 6 is primarily conveyed through the printing station by its frictional engagement with the platen roller rather than being pulled through such station by the belts and clamp. Such pulling could impart a slight tension stretch to the paper, which could result in mis-registration between the successive color separations.

Although three pairs of pulleys or sprockets have been disclosed above, it will be appreciated that only two such pairs and parallel belt runs could be employed with equal effect, it only being essential that the length of the belts be greater than that of the largest paper length which the printer is designed to accommodate.

What is claimed is:

1. A thermal transfer printer, comprising:

(a) a pair of axially spaced sprockets (3c) mounted on opposite ends of a shaft, (b) a platen roller (20) mounted on the shaft between the sprockets, (c) a pair of parallel, endless, equal length timing belts (2) individually supported by and disposed around the sprockets, (d) means for tensioning and rotatably advancing the belts, (e) a thermal printing head reciprocably mounted proximate the platen roller for movement into and out of engagement with the roller and defining a printing station therewith, (f) clamping means (7') mounted laterally across and between the belts for clamping a leading edge of a sheet (6) of material to be printed, and (g) an advanceable ink ribbon web (8) extending through the printing station between the head and the roller, (h) wherein the diameter of the sprockets and the platen roller, and the thickness of the belts, are such that the peripheral speeds of the belts and the roller are substantially the same, and wherein the lengths of the belts are greater than the length of the longest sheet of material which the printer is designed to accommodate.

2. A printer according to claim 1, wherein the outer surface of the platen roller is covered with a layer of elastomer, and wherein the peripheral speed of the roller is slightly greater than that of the belts such that a sheet to be printed is primarily conveyed through the printing station by frictional engagement with the roller.

3. A printer according to claim 1, wherein the tensioning and rotatably advancing means comprises at least one further pair of sprockets mounted on opposite ends of an associated shaft disposed parallel to said first recited shaft.

4. A printer according to claim 3, wherein the belts are transversely ribbed for cooperation with teeth of the sprockets.

* * * * *